United States Patent
Kitano

(10) Patent No.: US 9,376,094 B2
(45) Date of Patent: Jun. 28, 2016

(54) BRAKE PEDAL DEVICE

(71) Applicant: Hajime Kitano, Toyota (JP)

(72) Inventor: Hajime Kitano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 18 days.

(21) Appl. No.: 14/407,503

(22) PCT Filed: Aug. 21, 2013

(86) PCT No.: PCT/IB2013/001888
§ 371 (c)(1),
(2) Date: Dec. 12, 2014

(87) PCT Pub. No.: WO2014/030060
PCT Pub. Date: Feb. 27, 2014

(65) Prior Publication Data
US 2015/0183408 A1 Jul. 2, 2015

(30) Foreign Application Priority Data
Aug. 23, 2012 (JP) .................................. 2012-184032

(51) Int. Cl.
*B60T 7/06* (2006.01)
*B60R 21/09* (2006.01)
*G05G 1/323* (2008.04)

(52) U.S. Cl.
CPC ................ *B60T 7/065* (2013.01); *B60R 21/09* (2013.01); *G05G 1/323* (2013.01)

(58) Field of Classification Search
CPC ......... B60T 7/065; B60R 21/09; G05G 1/323
See application file for complete search history.

(56) References Cited

U.S. PATENT DOCUMENTS

| | | | |
|---|---|---|---|
| 6,070,488 A | 6/2000 | Yabusaki et al. | |
| 7,568,545 B2* | 8/2009 | Tanigawa | B60R 21/09 180/274 |
| 7,775,555 B2* | 8/2010 | Allen | B60K 23/02 180/274 |
| 8,172,026 B2* | 5/2012 | Yamazaki | B60R 21/09 180/274 |
| 2005/0050980 A1* | 3/2005 | Park | B60T 7/065 74/512 |
| 2005/0103151 A1* | 5/2005 | Yoon | G05G 1/30 74/512 |
| 2008/0000709 A1 | 1/2008 | Tanigawa et al. | |
| 2010/0154581 A1* | 6/2010 | Sukonthapanich | B60R 21/09 74/512 |
| 2014/0260766 A1* | 9/2014 | Sukonthapanich | G05G 1/327 74/512 |
| 2015/0329089 A1* | 11/2015 | Kitaguchi | B60T 7/065 74/512 |

FOREIGN PATENT DOCUMENTS

| | | | | |
|---|---|---|---|---|
| ES | WO 2008142193 A1 * | 11/2008 | | B60R 21/09 |
| JP | H10324228 A | 12/1998 | | |
| JP | H11198776 A | 7/1999 | | |
| JP | H11198778 A | 7/1999 | | |
| JP | H11510452 A | 9/1999 | | |
| JP | 2001233187 A | 8/2001 | | |
| JP | 2006103501 A * | 4/2006 | | |
| JP | 2006290203 A * | 10/2006 | | |
| JP | 2007320404 A | 12/2007 | | |

* cited by examiner

Primary Examiner — James English
(74) Attorney, Agent, or Firm — Oliff PLC

(57) ABSTRACT

A pedal bracket is fixed to a dash panel on an interior side of a vehicle room. A brake arm is oscillatably supported by the pedal bracket and has a brake pedal pad at its one end. A coupling arm is supported by the pedal bracket and couples a push rod and the brake arm together. A rotating arm is supported by the coupling arm in a rotatable state. One end of the rotating arm contacts with a fixed bracket and thereby rotates the rotating arm when the pedal bracket is displaced in a vehicle rearward direction. The rotation causes contact of another end of the rotating arm with the push rod to induce curving of the push rod.

4 Claims, 6 Drawing Sheets

BRAKE PEDAL DEVICE

BACKGROUND OF THE INVENTION

1. Field of the Invention

The present invention relates to a brake pedal device, particularly to a brake pedal device which hinders a brake pedal from being displaced in a vehicle rearward direction when external force is applied from a front side of a vehicle.

2. Description of Related Art

A hydraulic brake system for a vehicle has been known which generates hydraulic pressure according to operating force on a brake pedal in a hydraulic circuit, provides, the hydraulic pressure in the hydraulic circuit to wheel cylinders, and thereby applies braking force to wheels of a vehicle. In such a hydraulic brake system for a vehicle, a brake pedal device configured with a brake pedal and its link mechanism or the like is arranged on a vehicle room side across a dash panel which serves as a partition wall, and hydraulic pressure generation section configured with a brake booster, a master cylinder, and so forth is arranged outside the dash panel. The brake pedal device and the hydraulic pressure generation section are coupled together by a push rod.

If large external force is applied to the vehicle from the front side of the vehicle, for example, if the vehicle receives external force due to a collision or the like, the external force may displace components arranged outside the vehicle room that include the hydraulic pressure generation section and so forth toward the dash panel, resulting in deformation of the dash panel. This may push out the brake pedal device in the vehicle rearward direction. A brake pedal device has been known which includes a structure that hinders the brake pedal device and particularly a brake pedal pad from being displaced in the vehicle rearward direction in the above case. For example, Japanese Patent Application Publication No. 2001-233187 (JP 2001-233187 A) discloses a configuration in which when external force is applied from the front side of the vehicle, the brake pedal device itself is allowed to rotate and to bend the push rod to prevent the displacement of the components arranged outside the vehicle room from being transmitted to the brake pedal device without any reduction and a rearward displacement of the brake pedal device is thereby reduced.

Further, Japanese Patent Application Publication No. 11-198776 (JP 11-198776 A) and Japanese Patent Application Publication No. 11-198778 (JP 11-198778 A) disclose devices in which when external force is applied from the front side of the vehicle, the brake pedal rotates in the vehicle rearward direction to bend the push rod and further displacement of the brake pedal in the vehicle rearward direction is thereby prevented.

However, in the case of the brake pedal device disclosed in JP 2001-233187 A, the brake pedal device is required to be structured to facilitate rotation of the device itself, resulting in difficulty in obtainment of rigidity. This may complicate the structure. In addition, in the structures of JP 11-198776 A and JP 11-198778 A, because the brake pedal is displaced in the vehicle rearward direction, a driver who puts his/her foot on the brake pedal pad may more easily experience awkwardness.

SUMMARY OF THE INVENTION

The present invention provides a brake pedal device which hinders a brake pedal from being displaced in a vehicle rearward direction when external force is applied.

A brake pedal device in accordance with an aspect of the present invention includes: a partition wall that partitions an interior of a vehicle room where a brake pedal is arranged from an exterior; a vehicle body configuration member positioned behind the partition wall in a vehicle front-rear direction; a fixed bracket fixed to the vehicle body configuration member; a pedal bracket arranged between the partition wall and the vehicle body configuration member and fixed to the partition wall; a brake arm rotatably supported by the pedal bracket and having a brake pedal pad at one end of the brake arm; a push rod initiating generation of braking force; a coupling arm supported by the pedal bracket and coupling the push rod and the brake arm together; and a rotating arm supported by the coupling arm in a rotatable state, in which contact of one end of the rotating arm with the fixed bracket causes rotation of the rotating arm when the pedal bracket is displaced in a vehicle rearward direction, and the rotation causes contact of another end of the rotating arm with the push rod to induce curving of the push rod.

According to the aspect, the brake pedal can be hindered from rotating toward the rear of the vehicle room due to the displacement of the pedal bracket in the rearward direction.

In the aspect, the coupling arm may be configured such that when the pedal bracket is displaced in the vehicle rearward direction, the one end of the coupling arm contacts with the fixed bracket to rotate the brake arm in a pedaling direction. According to the aspect, the brake pedal can be hindered from rotating toward the rear of the vehicle room.

In the aspect, the rotating arm may contact with a coupling member that couples the push rod and the coupling arm together. Further, in the aspect, the push rod may include a curve facilitation portion that facilitates curving according to stress from the rotating arm: According to the aspect, the push rod can more certainly be curved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the present invention (hereinafter referred to as "embodiment") will be described hereinafter in detail with reference to drawings.

Figure 1:
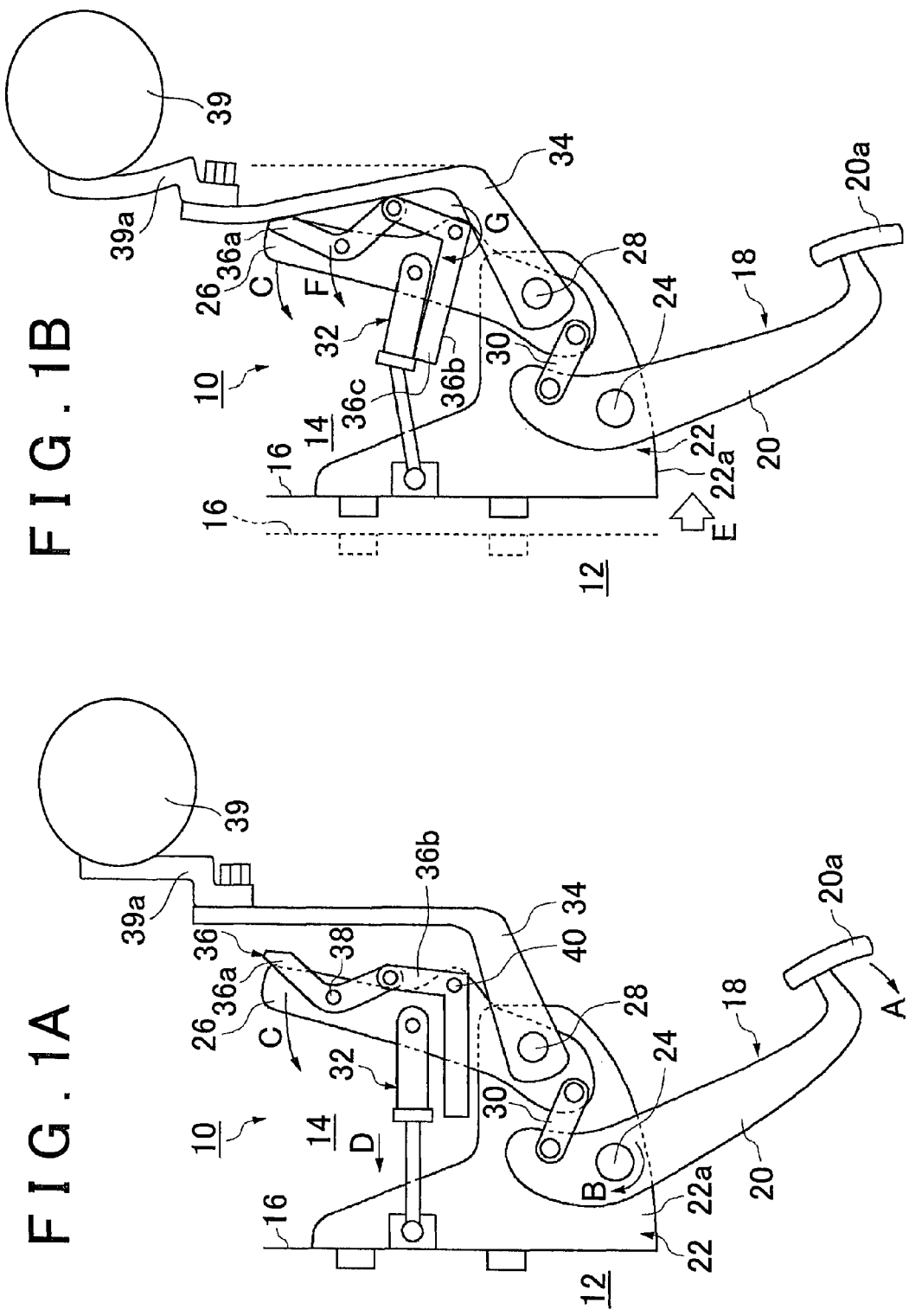
FIG. 1A is an explanatory view for explaining a state before a pedal rearward displacement prevention operation of a brake pedal device in accordance with an embodiment of the present invention.
FIG. 1B is an explanatory view for explaining a state after the pedal rearward displacement prevention operation of the brake pedal device in accordance with the embodiment of the present invention.

FIGS. 1A and 1B are explanatory views for explaining an overall configuration of a brake pedal device 10 in accordance with an embodiment of the present invention. More specifically, FIG. 1A is an explanatory view for explaining a state before a pedal rearward displacement prevention operation of the brake pedal device in accordance with the embodiment. Further, FIG. 1B is an explanatory view for explaining a state after the pedal rearward displacement prevention operation. In the drawings that will be explained below, minimum necessary parts in this embodiment are shown, and other parts are appropriately omitted. Further, the same parts may appropriately be omitted among the drawings.

A dash panel 16 is generally vertically arranged as a partition wall for partitioning an engine room 12 from a vehicle room interior space 14. An upper end portion of the dash panel 16 is arranged with a vehicle width direction being its longitudinal direction and is fixed to a cowl inner panel which is not shown and forms a portion of a cowl by spot welding or the like. Further, a lower end portion of the dash panel 16 is fixed to a floor panel which is not shown by spot welding or the like.

In the engine room 12, a brake booster which is not shown is arranged, which enhances pedal force of a driver applied to a brake pedal pad 20a fixed to one end of a brake arm 20 which forms a brake pedal 18. Further, in the engine room 12, a master cylinder for converting pressure enhanced by the brake booster into hydraulic pressure, a reservoir tank for storing and refilling brake fluid in response to a volume change in a hydraulic system, and the like are arranged.

Meanwhile, in the vehicle room interior space 14, in other words, behind the dash panel 16 in a vehicle front-rear direction, a pipe-shaped instrument panel reinforcement 39 which functions as a highly strong and highly rigid vehicle body configuration member extending in the vehicle width direction is disposed. Further, on the vehicle room interior space 14 side, a reinforcing member 39a for reinforcing the cowl arranged in the upper end portion of the dash panel 16 and for reinforcing the instrument panel reinforcement is arranged. The reinforcing member 39a is integrally fixed to the instrument panel reinforcement 39 by welding or the like to form an instrument panel reinforcement assembly. In this embodiment, an instrument panel reinforcement bracket is fixed to the reinforcing member 39a of the instrument panel reinforcement assembly.

The pedal bracket 22 is fixed to the dash panel 16 on the vehicle room interior space 14 side. In the pedal bracket 22, two side plates 22a facing each other at an interval in the vehicle width direction are connected together by a connection plate and are tightly fixed to the dash panel 16 by bolts or the like. A first oscillation shaft 24 serving as a center of oscillation of the brake arm 20 is inserted through the side plates 22a. In addition, a second oscillation shaft 28 serving as a center of oscillation of a coupling arm 26 is inserted through the side plates 22a. The coupling arm 26 is supported by the pedal bracket 22 and has a function of coupling the push rod described later which initiates generation of braking force and the brake arm 20 together. The brake arm 20 and the coupling arm 26 are connected together by an arm link 30. Accordingly, when the brake pedal pad 20a is pushed in the direction indicated by an arrow A by the driver and the brake arm 20 rotates around the first oscillation shaft 24 as the center in the direction indicated by an arrow B, the coupling arm 26 rotates around the second oscillation shaft 28 as the center in the direction indicated by an arrow C.

The coupling arm 26 is configured such that one end of a push rod 32 connected to the brake booster which is not shown is rotatably fixed to the coupling arm 26 and the coupling arm 26, when rotating in the direction indicated by the arrow C, pushes the push rod 32 in the direction indicated by an arrow D and thereby enables generation of braking force. The second oscillation shaft 28 inserted through the pedal bracket 22 rotatably supports a fixed bracket 34 fixed to the instrument panel reinforcement 39 as well as supporting the coupling arm 26.

Further, a rotating arm 36 is provided in the coupling arm 26 on a side far from the second oscillation shaft 28. In an example of FIG. 1A, the rotating arm 36 is configured with a first arm 36a and a second arm 36b. The first arm 36a is rotatably supported around a first shaft 38 as a center by the coupling arm 26. The second arm 36b is rotatably supported around a second shaft 40, as a center by the coupling arm 26. The first arm 36a which is one end of the rotating arm 36 is configured in a shape which is capable of contacting with the fixed bracket 34. Meanwhile, the, second arm 36b which is the other end of the rotating arm 36 is configured in a shape which is capable of contacting with the push rod 32 and providing stress to curve the push rod 32 in a different direction from its axial direction.

In the brake pedal device 10 configured as described above, operations of the arms and the link in a normal braking operation will first be described. As shown in FIG. 1A, when the brake pedal pad 20a is pushed by the driver in the direction indicated by the arrow A, the brake arm 20 oscillates around the first oscillation shaft 24 as the center in the direction indicated by the arrow B. As a result, the coupling arm 26 coupled to the brake arm 20 by the arm link 30 rotates around the second oscillation shaft 28 as the center in the direction indicated by the arrow C and pushes the push rod 32 in the direction indicated by the arrow D, thereby generating braking force. In this case, the first arm 36a and the second arm 36b as the rotating arm 36 rotate in the direction indicated by the arrow C together with the coupling arm 26. However, the rotating arm 36 does not contact with the other components and does not operate.

However, as shown in FIG. 1B, when external force is applied from the front side or the like of the vehicle due to some causes and, the dash panel 16 is displaced in the vehicle rearward direction (the direction indicated by an arrow E), the relative distance between the dash panel 16 and the instrument panel reinforcement 39 decreases. As a result, the first arm 36a which is rotatably supported by the coupling arm 26 supported by the pedal bracket 22 first contacts with the fixed bracket 34 and rotates in the direction indicated by an arrow F. Here, the first arm 36a may contact with the instrument panel reinforcement 39 or the reinforcing member 39a instead of the fixed bracket 34. Further, the second arm 36b rotates in the direction indicated by an arrow G Consequently, a distal end portion 36c of the second arm 36b contacts with the push rod 32 from the horizontal direction with respect to the axis of the push rod 32. In other words, the second arm 36b provides stress to curve the push rod 32 in the different direction from its axial direction by bringing the distal end portion 36c into contact with the push rod 32. The push rod 32 receives compressive force due to the force caused by displacement of the pedal bracket 22; therefore, the stress due to the contact of the distal end portion 36c is provided to the push rod 32. As shown in FIG. 1B, this allows the push rod 32 to easily bend in the direction perpendicular to its axial direction, for example. Further, when the push rod 32 more largely bends, the push rod 32 is more easily ruptured. Curving of the push rod 32 is facilitated, and the relative distance between the pedal bracket 22 and the coupling arm 26 is thereby reduced. This enables absorption of the displacement of the dash panel 16 in the vehicle rearward direction. In other words, the pedal bracket 22 is displaced in the rearward direction, and the coupling arm 26 thereby rotates in the opposite direction (see FIG. 1A) to the direction indicated by the arrow C, thus hindering the brake arm 20 from oscillating in the opposite direction to the direction indicated by the arrow B. That is, the brake pedal pad 20a is hindered from protruding toward the rear of the vehicle room.

Further, in this embodiment, when the pedal bracket 22 is displaced in the vehicle rearward direction, one end of the coupling arm 26, specifically, an end which supports the first arm 36a contacts with the fixed bracket 34, and the coupling arm 26 thereby rotates in the direction indicated by the arrow C (see FIG. 1A). Accordingly, the brake arm 20 is oscillated in a pedaling direction. This operation is performed in the same way as the operation in which the brake pedal pad 20a is pushed by the driver. That is, the brake pedal pad 20a is automatically hindered from protruding toward the rear of the vehicle room.

As described above, in the brake pedal device 10 of this embodiment, even when external force is applied from the front side or the like of the vehicle due to some causes and the pedal bracket 22 is displaced in the vehicle rearward direction, the operations of the rotating arm 36 and the coupling arm 26 provide an effect of hindering the brake pedal pad 20a from being pushed out in the vehicle rearward direction in both cases where the push rod 32 is and is not pushed toward the master cylinder. Although FIG. 1B is drawn as if the fixed bracket 34 were displaced for explaining the decrease in the relative distance between the dash panel 16 and the fixed bracket 34, because the fixed bracket 34 is in reality fixed to the instrument panel reinforcement 39, the dash panel 16, the pedal bracket 22, and so forth are displaced toward the fixed bracket 34.

Figure 2:
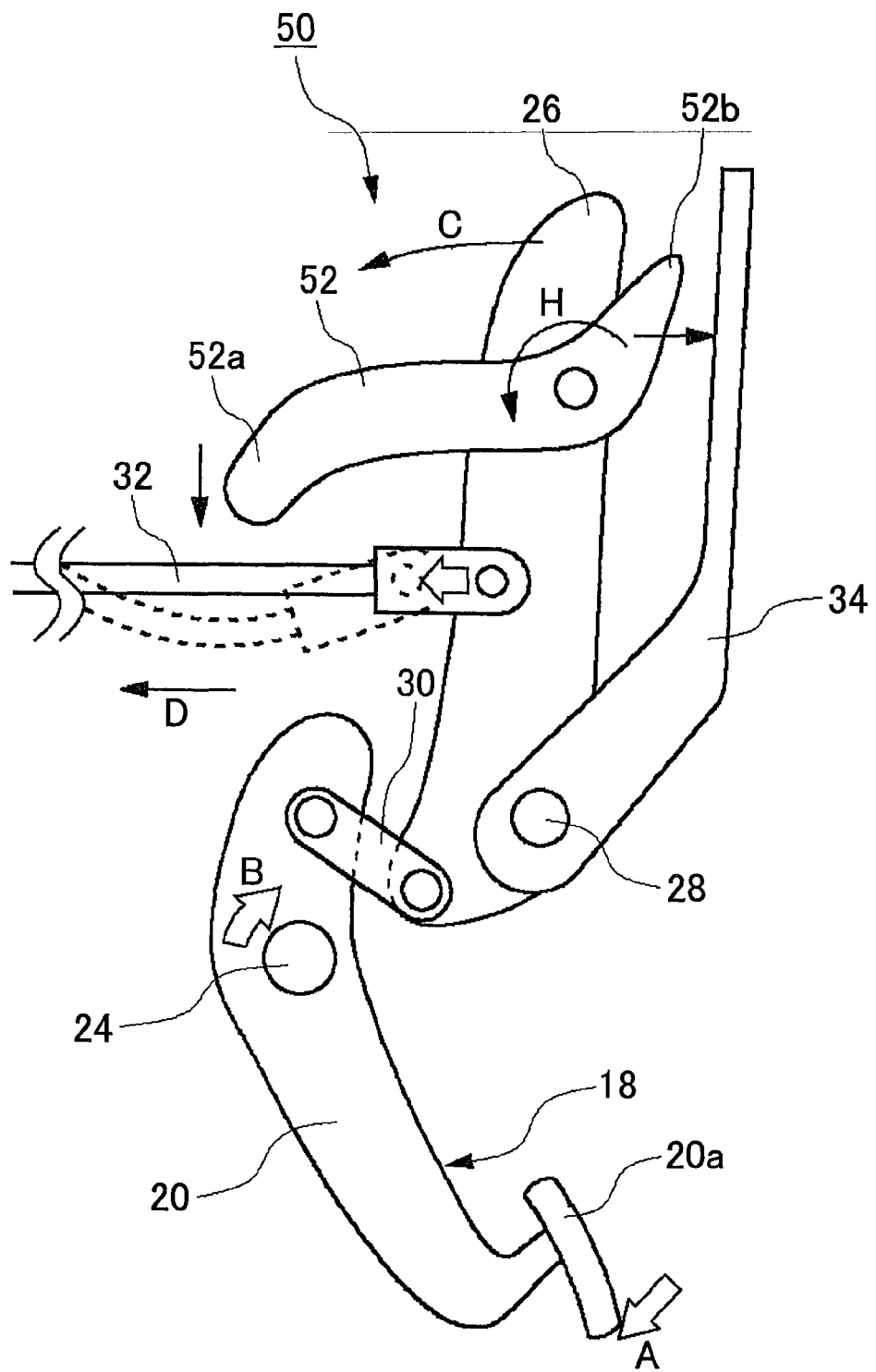
FIG. 2 is an explanatory view for explaining a schematic configuration of a brake pedal device in accordance with another embodiment of the present invention.

FIG. 2 shows a structure example of a brake pedal device 50 in another configuration in which the rotating arm provides stress so that the push rod 32 is curved when external force is applied from the front side of the vehicle. In the structure of FIG. 2, except that the rotating arm is configured with a single part, its basic structure is the same as the structure shown in FIGS. 1A and 1B. In the brake pedal device 50, a rotating arm 52 is generally S-shaped, one end thereof contacts with the fixed bracket 34 and thereby rotates in the direction indicated by an arrow H, and the other end thereof contacts with the push rod 32 and thereby provides stress to curve the push rod 32.

In a normal operation of the brake pedal device 50, the brake pedal pad 20a of the brake pedal 18 is pushed in the direction indicated by the arrow A by the driver, and the brake arm 20 thereby rotates around the first oscillation shaft 24 as the center in the direction indicated by the arrow B. The coupling arm 26 rotates around the second oscillation shaft 28 as the center in the direction indicated by the arrow C via the arm link 30. As a result, the coupling arm 26 pushes out the push rod 32 in the direction indicated by the arrow D, thereby providing braking force.

On the other hand, when external force is applied from the front side or the like of the vehicle due to some causes and the dash panel (not shown) is displaced in the vehicle rearward direction, the relative distance between the dash panel and the instrument panel reinforcement 39 decreases. As a result, an end portion 52b of the rotating arm 52 which is rotatably supported by the coupling arm 26 supported by the pedal bracket (not shown) contacts with the fixed bracket 34 and rotates in the direction indicated by the arrow H. Consequently, a distal end portion 52a of the rotating arm 52 contacts with the push rod 32 from the horizontal direction with respect to the axis of the push rod 32. In other words, the rotating arm 52 provides stress to curve the push rod 32 in a different direction from its axial direction by bringing the distal end portion 52a into contact with the push rod 32. The push rod 32 receives compressive force due to the force caused by displacement of the, pedal bracket and thus is provided with stress due to the contact of the distal end portion 52a. Ina similar manner to the example of FIG. 1B, this facilitates the push rod 32 to be curved in a perpendicular direction to the axial direction, for example. When the push rod 32 more largely bends, the push rod 32 is more easily ruptured. Curving of the push rod 32 is facilitated, and the relative distance between the pedal bracket and the coupling arm 26 is thereby reduced. This enables absorption of the displacement of the dash panel in the vehicle rearward direction. In other words, the pedal bracket is displaced in the rearward direction, and the coupling arm 26 thereby rotates in the opposite direction to the direction indicated by the arrow C, thus hindering the brake arm 20 from oscillating in the opposite direction to the direction indicated by the arrow B. That is, the brake pedal pad 20a is hindered from oscillating toward the rear of the vehicle room. This hinders awkwardness that the brake pedal pad 20a is pushed out from being given to the driver who puts his/her foot on the brake pedal pad 20a.

Further, also in the example of FIG. 2, when the pedal bracket is displaced in the vehicle rearward direction, the end portion of the coupling arm 26 on the opposite side: to the end coupled to the brake arm 20 contacts with the fixed bracket 34. As a result, the coupling arm 26 rotates in the direction indicated by the arrow C, the brake arm 20 can be oscillated in the pedaling direction. This operation is performed in the same way as the case where the brake pedal pad 20a is pushed by the driver. That is, the brake pedal pad 20a is hindered from protruding toward the rear of the vehicle room. As described above, also in the example of FIG. 2, in a similar manner to the example of FIG. 1B, even when the pedal bracket is displaced in the vehicle rearward direction, the operations of the rotating arm 52 and the coupling arm 26 hinder the brake pedal pad 20a from being pushed out in the vehicle rearward direction. This provides an effect of preventing the awkwardness due to the behavior of the brake pedal pad 20a from being given to the driver in both cases where the push rod 32 is and is not pushed toward the master cylinder.

Figure 3A:
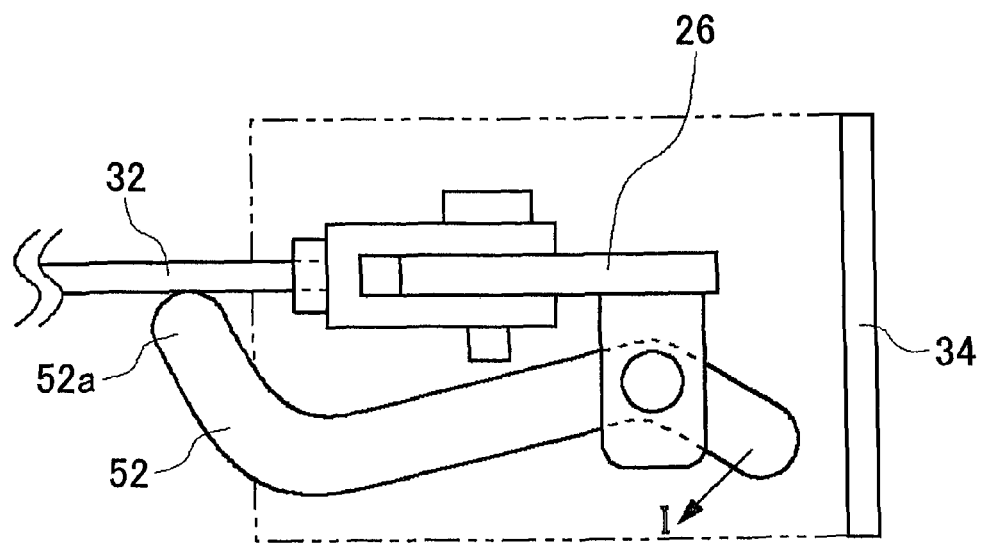
FIG. 3A is an explanatory view for explaining another arrangement example of a rotating arm of the brake pedal device of FIG. 2.
Figure 3B:
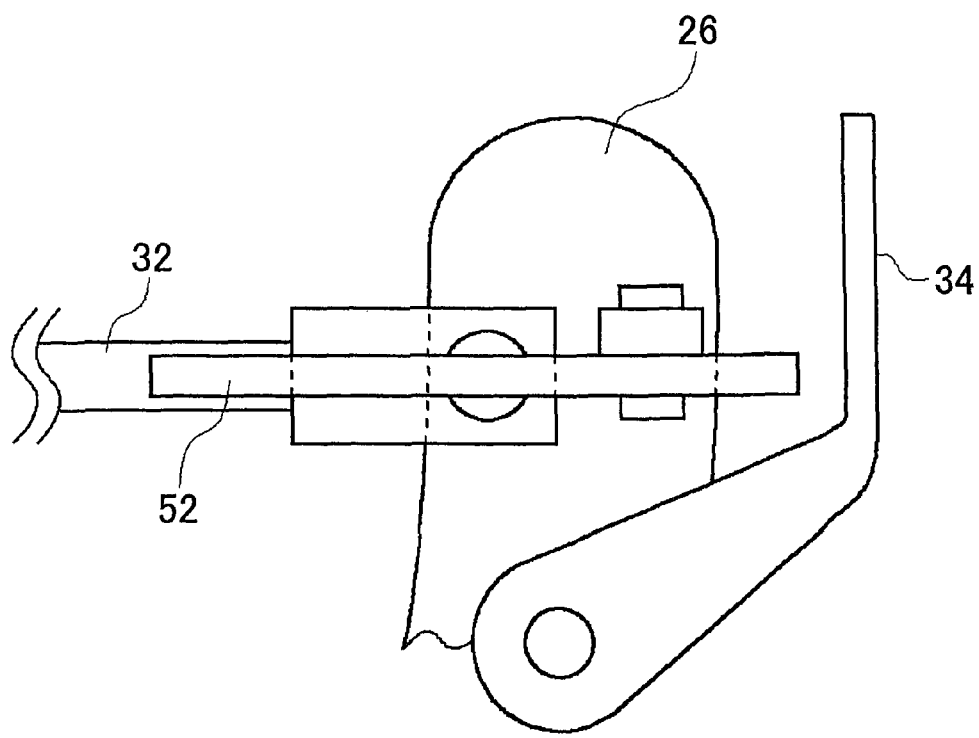
FIG. 3B is an explanatory view for explaining another arrangement example of a rotating arm of the brake pedal device of FIG. 2.

FIGS. 3A and 3B show a modified example of the brake pedal device 50 of FIG. 2. In the example of FIGS. 3A and 3B, the rotating arm 52 is mounted to oscillate in a perpendicular direction to the oscillating direction of the coupling arm 26. In this case also, when external force is applied from the front side or the like of the vehicle due to some causes and the dash panel (not shown) is displaced in the vehicle rearward direction, the rotating arm 52 which is rotatably supported by the coupling arm 26 supported by the pedal bracket (not shown) contacts with the fixed bracket 34 and rotates in the direction indicated by an arrow I. Consequently, the distal end portion 52a of the rotating arm 52 contacts with the push rod 32 from the horizontal direction with respect, to the axis of the push rod 32. In other words, the rotating arm 52 provides stress to curve the push rod 32 in a different direction from its axial direction by bringing the distal end portion 52a into contact with the push rod 32. As a result, in a similar manner to the example of FIG. 2, this facilitates the push rod 32 to be curved in a perpendicular direction to the axial direction, for example. Further, the push rod 32 is more easily ruptured as its bending further progresses.

As described above, as long as the rotating arm 52 contacts with the fixed bracket 34, rotates, and thereby provides stress to the push rod 32, a manner of arrangement of the rotating arm 52 is appropriately selectable and can provide the same effect as the above-described examples. Further, varying the arrangement of the rotating arm 52 enables increased choices of layouts of parts, thereby contributing to an improvement in design versatility.

Figure 4:
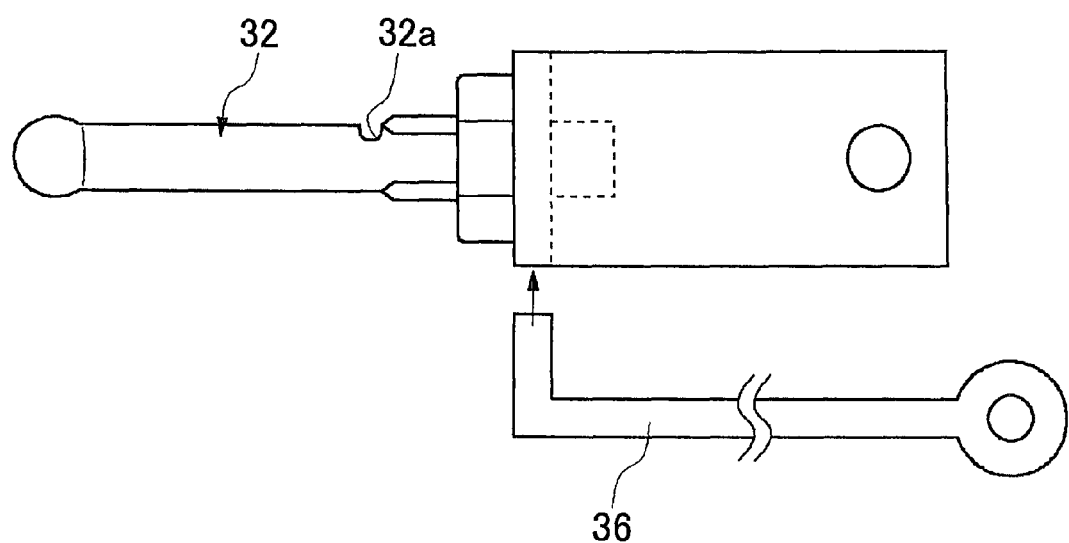
FIG. 4 is an explanatory view for explaining a configuration example of a push rod of the brake pedal device in accordance with the embodiment of the present invention.

FIG. 4 shows a shape example of the push rod 32 which facilitates curving thereof when stress is provided by the rotating arm 36. In this case, a notch portion 32a is formed in a portion of the push rod 32 as a curve facilitation section which facilitates curving of the push rod 32 on the basis of stress from the rotating arm 36. In FIG. 4, the notch portion 32a is formed on the opposite side to the point of application to which the stress by the rotating arm 36 is provided. The notch portion 32a is formed, thereby improving the curving efficiency in the case where the stress is provided by the rotating arm 36 and improving the ease of rupture according to progress of curving. It is preferable that the size and position of the notch portion 32a be appropriately selected on the basis of examinations or the like in a design phase in order to prevent deformation in the case where the coupling arm 26 rotates in the direction indicated by the arrow C (see FIG. 1A and so forth), in other words, in the case where compressive force in a vehicle forward direction in a normal use of the push rod 32 is applied to the push rod 32.

Figure 5A:
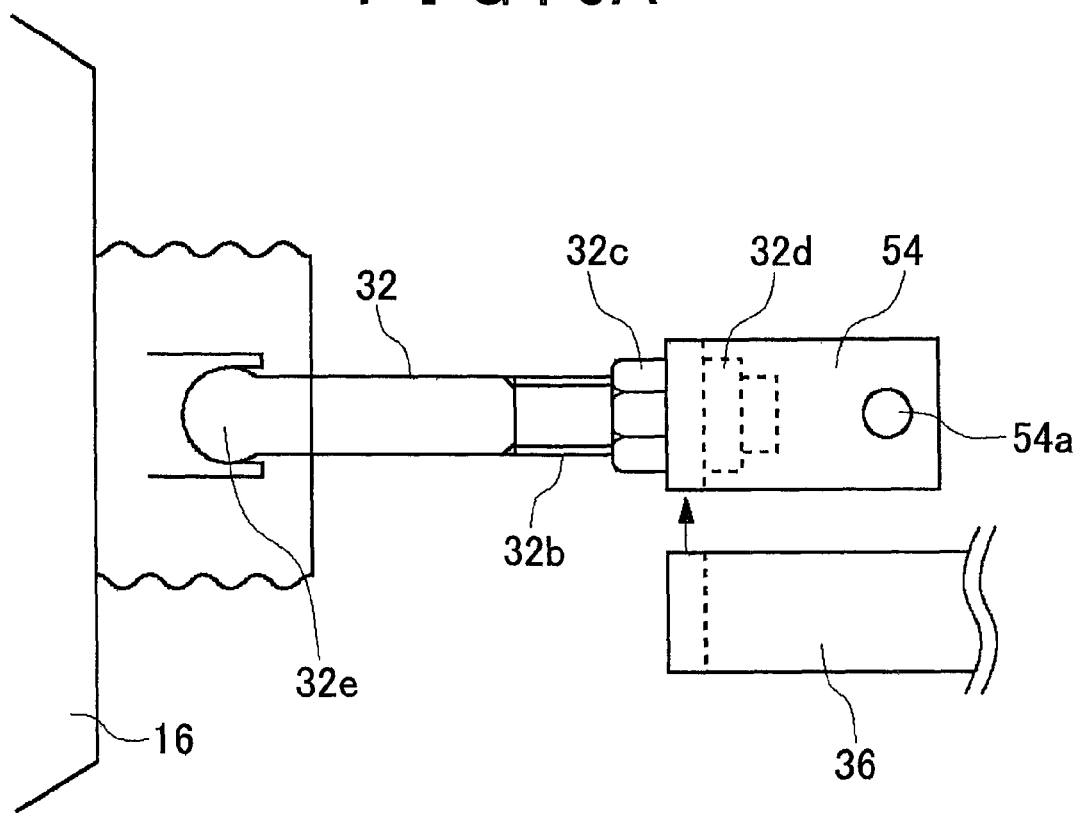
FIG. 5A is an explanatory view for explaining another configuration example of a vicinity of a push rod of the brake pedal device in accordance with the embodiment of the present invention.
Figure 5B:
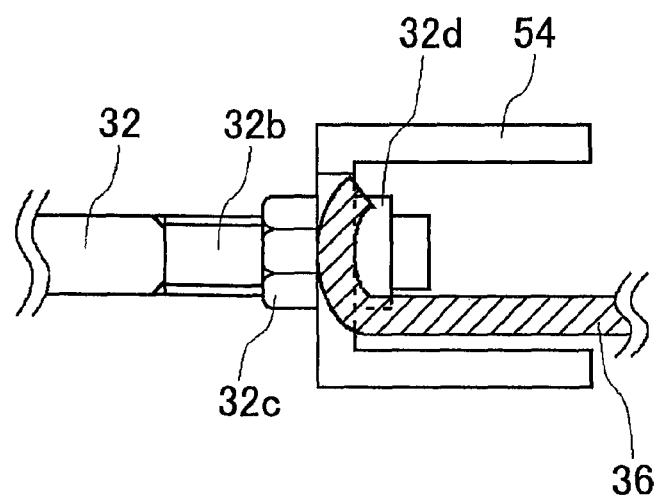
FIG. 5B is an explanatory view for explaining the other configuration example of the vicinity of the push rod of the brake pedal device in accordance with the embodiment of the present invention.

FIGS. 5A and 5B are explanatory views for explaining a modified example for effectively curving the push rod 32. So that the push rod 32 efficiently transmits the displacement due to rotation of the coupling arm 26 (see FIG. 1A and so forth) in the direction indicated by the arrow C, the distance between the dash panel 16 and the coupling arm 26 is required to be appropriately adjusted. Accordingly, as shown in FIGS. 5A and 5B, in this embodiment, the push rod 32 has a threaded portion 32b at one end and is fixed to a clevis 54 (U link) functioning as a coupling member by use of nuts 32c and 32d such that the length of the push rod 32 is adjustable. A distal end portion 32e of the push rod 32 is rotatably supported by the brake booster, and an end portion 54a of the clevis 54 is also rotatably supported by the coupling arm 26. Further, the rotating arm 36 is arranged to contact with a side surface of the clevis 54.

Figure 6:
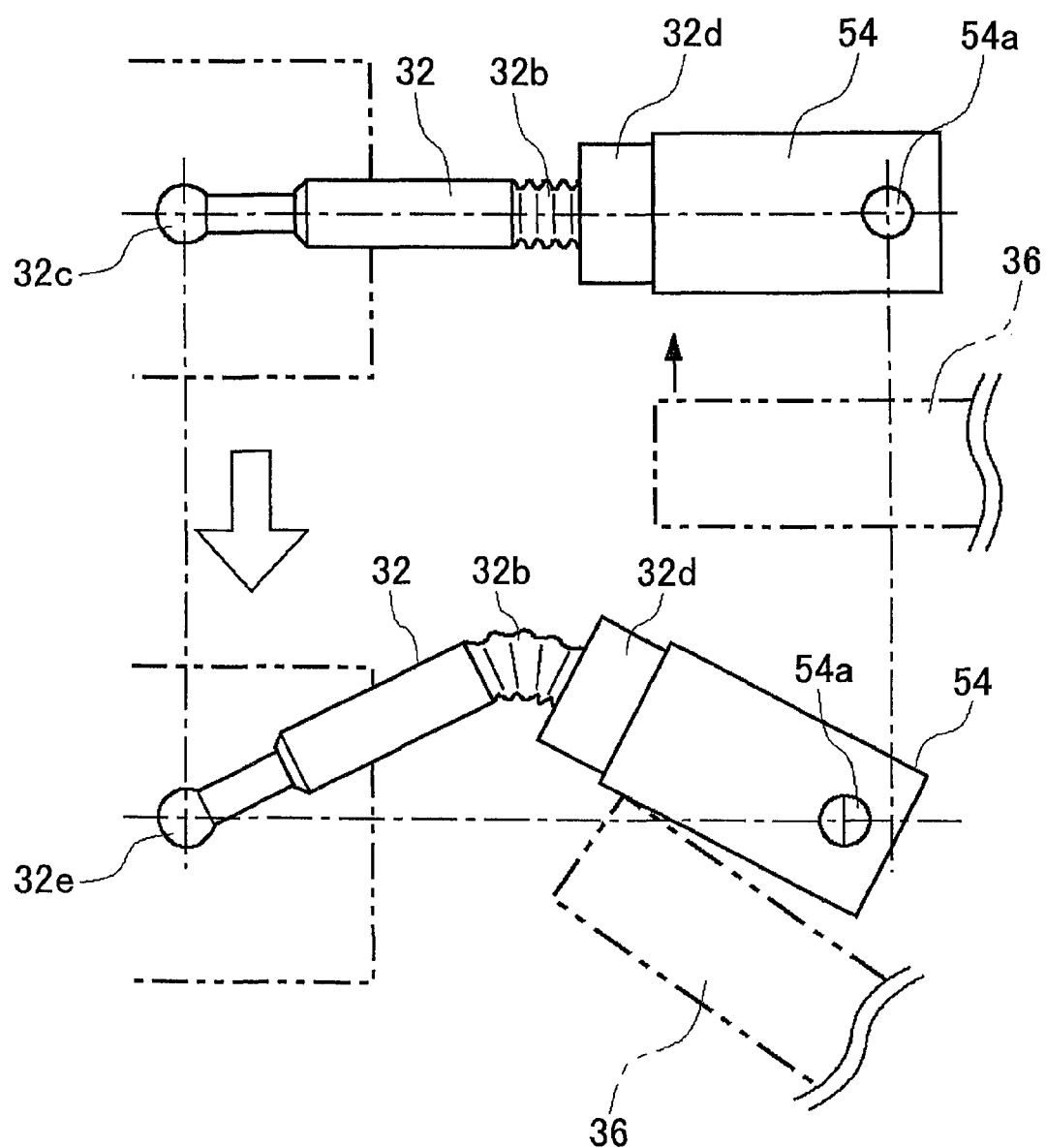
FIG. 6 is an explanatory view for explaining an operation of the configuration example of FIGS. 5A and 5B.

In the above configuration, when external force is applied from the front side or the like of the vehicle due to some causes, the dash panel is displaced in the vehicle rearward direction, and the rotating arm 36 provides stress to the push rod 32 via the clevis 54, as shown in FIG. 6, the threaded portion 32b deforms. As a result, even in a case where the stress provided by the rotating arm 36 is small, the compressive force due to displacement of the dash panel effectively acts on the threaded portion 32b and curving (bowing) that, a retraction of the coupling arm 26 in the vehicle forward direction (a retraction of the end portion 54a of the clevis 54) is thereby increased. In other words, absorption of displacement is effectively performed by displacement of the dash panel, thereby hindering the oscillation of the brake arm 20 in the vehicle rearward direction in the examples described above. Accordingly, the threaded portion 32b functions as the curve facilitation section which facilitates curving on the basis of the stress from the rotating arm 36.

Further, differently from the examples of FIGS. 1B, 2, 3A, and 3B the rotating arm 36 is brought into contact with a flat surface of the clevis 54 instead of a side surface (a side surface of a cylindrical shape) of the push rod 32, and the stress provided by the rotating arm 36 can certainly be transmitted to the push rod 32. In the case of bringing the rotating arm 36 into contact with the side surface of the push rod 32, a slight positional offset or vibration may result in possible failure of contact. However, the rotating arm 36 and the clevis 54 are allowed to contact with each other, thereby excluding such possibility. Although the shape of a distal end portion of the rotating arm 36, in other words, a portion which contacts with the clevis 54 is appropriately selectable, as shown in FIG. 5B, in order to obtain a large contact surface on a side surface of the clevis 54, the distal end portion may be formed into a shape such as a hook shape according to the shape of the side surface of the clevis 54.

As described above, the threaded portion 32b is formed in the push rod 32 by use of the clevis 54, thereby obtaining a curve facilitation effect without forming the notch portion 32a by an additional process as shown in FIG. 4. This contributes to reduction in the process cost.

Also in the case of using the clevis 54, in a similar manner to the examples of FIGS. 1B, 2, 3A, and 3B the rotating arm 36 may be brought into contact with the threaded portion 32b of the push rod 32. In this case, to prevent the rotating arm 36 from being stuck on the threaded portion 32b when they contact with each other, a contacting surface of the rotating arm 36 may be formed into a shape such as a larger shape than the thread pitch or a hook shape as shown in FIG. 5B.

In the foregoing, the present invention has been described with reference to the above-described embodiments. However, the present invention is not limited to the above-described embodiments, but includes appropriate combinations and substitutions of configurations of the embodiments. In addition, various modifications such as changes in design can be applied to the embodiments on the basis of knowledge of persons having ordinary skill in the art, and embodiments to which such modifications are applied are included in the scope of the present invention.

The invention claimed is:
1. A brake pedal device comprising:
a partition wall that partitions an interior of a vehicle room where a brake pedal is arranged from an exterior;
a vehicle body configuration member positioned behind the partition wall in a vehicle front-rear direction; [1]
a fixed bracket that is fixed to the vehicle body configuration member;
a pedal bracket arranged between the partition wall and the vehicle body configuration member and fixed to the partition wall;
a brake arm that is rotatably supported by the pedal bracket and has a brake pedal pad at one end of the brake arm;
a push rod that initiates generation of braking force;
a coupling arm that is supported by the pedal bracket and couples the push rod and the brake arm together; and
a rotating arm supported by the coupling arm in a rotatable state, in which contact of one end of the rotating arm with the fixed bracket causes rotation of the rotating arm when the pedal bracket is displaced in a vehicle rearward direction, and the rotation causes contact of another end of the rotating arm with the push rod to induce curving of the push rod.

2. The brake pedal device according to claim 1,
wherein when the pedal bracket is displaced in the vehicle rearward direction, the one end of the coupling arm contacts with the fixed bracket to rotate the brake arm in a pedaling direction.

3. The brake pedal device according to claim 1, further comprising
a coupling member that couples the push rod and the coupling arm together,
wherein the rotating arm contacts with the coupling member.

4. The brake pedal device according to claim 3,
wherein the push rod includes a curve facilitation portion that facilitates according to stress from the rotating arm.

* * * * *